United States Patent
Song et al.

(10) Patent No.: US 7,834,983 B2
(45) Date of Patent: Nov. 16, 2010

(54) THREE-DIMENSIONAL MEASUREMENT SYSTEM AND RESCALING METHOD USING INDOOR GPS

(75) Inventors: Se-Hwan Song, Cheonan-si (KR); Seong-Youb Chung, Gwangju-si (KR); Sung-Han Kim, Daejeon (KR); Jin-Hyung Park, Daejeon (KR); Young-Jun Park, Daejeon (KR); Jae-Hoon Kim, Daejeon (KR)

(73) Assignee: Samsung Heavy Ind. Co., Ltd. (KR)

( * ) Notice: Subject to any disclaimer, the term of this patent is extended or adjusted under 35 U.S.C. 154(b) by 44 days.

(21) Appl. No.: 12/442,669

(22) PCT Filed: Sep. 21, 2007

(86) PCT No.: PCT/KR2007/004659

§ 371 (c)(1),
(2), (4) Date: Mar. 24, 2009

(87) PCT Pub. No.: WO2008/038969

PCT Pub. Date: Apr. 3, 2008

(65) Prior Publication Data

US 2010/0020305 A1    Jan. 28, 2010

(30) Foreign Application Priority Data

Sep. 26, 2006  (KR) .................. 10-2006-0093333

(51) Int. Cl.
*G01C 3/00* (2006.01)
*G01B 11/14* (2006.01)
*G01D 5/34* (2006.01)

(52) U.S. Cl. .................. 356/3; 356/614; 356/625; 250/231.13

(58) Field of Classification Search ............ 356/3, 356/3.05, 3.07, 3.08, 3.1, 3.12, 3.14, 4.06, 356/4.07, 614–625; 219/121.68; 250/231.13, 250/231.14, 202, 459.1
See application file for complete search history.

(56) References Cited

U.S. PATENT DOCUMENTS

| 6,181,423 | B1* | 1/2001 | Uriarte ................. 356/614 |
| 6,800,842 | B2* | 10/2004 | Ito ................. 250/231.13 |
| 6,909,516 | B1* | 6/2005 | Hoover ................. 356/615 |
| 7,655,882 | B2* | 2/2010 | Kaplan et al. .......... 219/121.68 |

FOREIGN PATENT DOCUMENTS

| JP | 09-033634 A | 2/1997 |
| KR | 10-1997-0075838 A | 12/1997 |
| KR | 10-2001-0100705 A | 11/2001 |
| KR | 10-2003-0048528 A | 6/2003 |

\* cited by examiner

*Primary Examiner*—Sang Nguyen
(74) *Attorney, Agent, or Firm*—Harness, Dickey & Pierce, P.L.C.

(57) ABSTRACT

A three-dimensional measurement system using an IGPS includes a rescale bar having linear scales thereon, a linear encoder for measuring an absolute length within which the linear encoder moves on the rescale bar, a plurality of optical transmitters that radiates pan beams, and a vector bar having one end attached to the linear encoder, and having a receiver to detect the pan beams radiated from the optical transmitters, the vector bar acquiring coordinates of two points where the vector bar moves by using the receiver, and measuring a relative length from the coordinates. A ratio between the absolute length and the relative length is applied in rescaling an actual distance between two positions to be measured.

2 Claims, 2 Drawing Sheets

[Fig. 1]
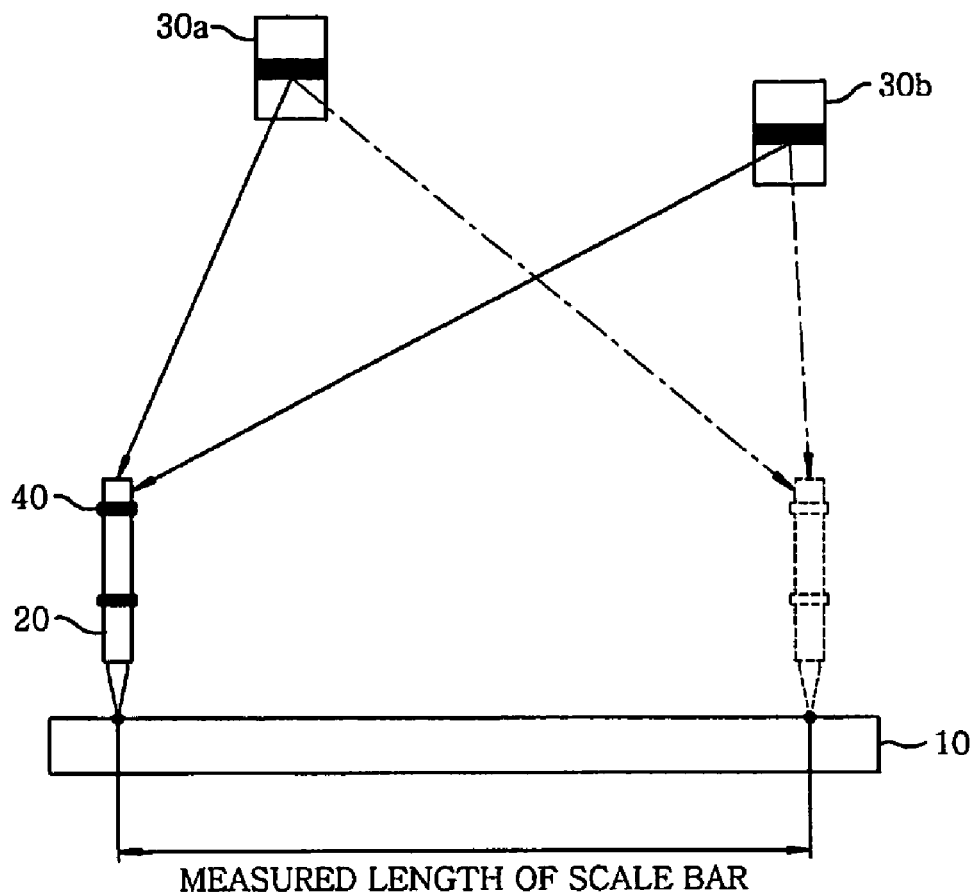
MEASURED LENGTH OF SCALE BAR
[Fig. 2]
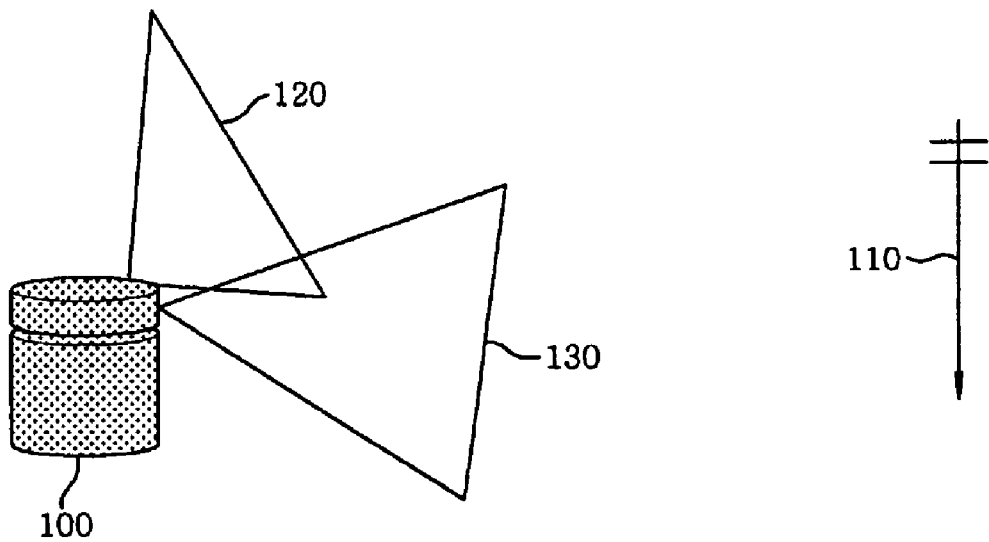

[Fig. 3]
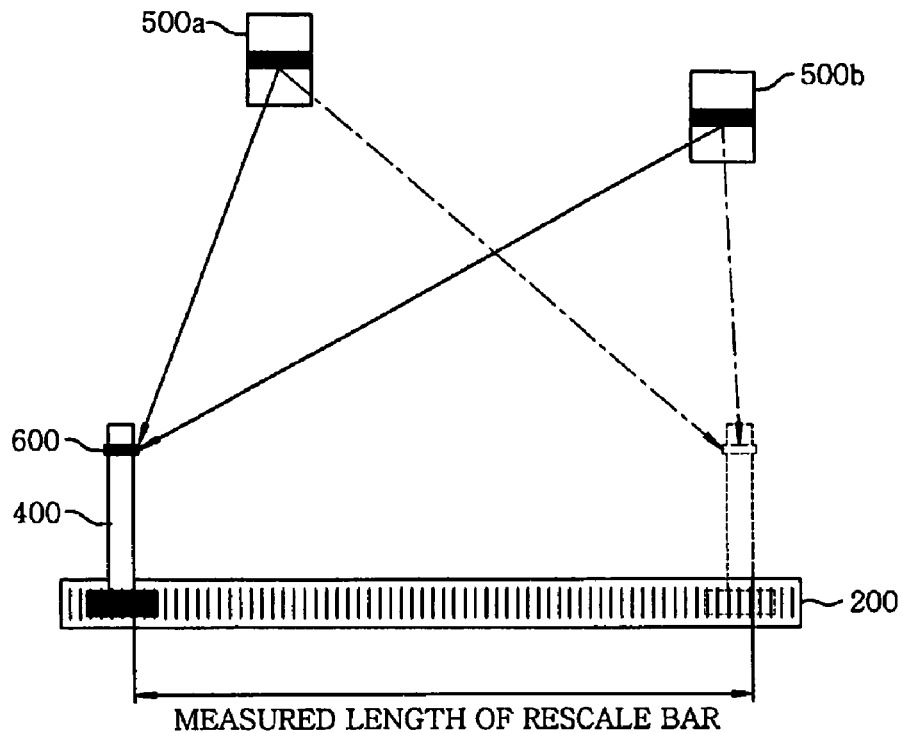
MEASURED LENGTH OF RESCALE BAR
[Fig. 4]
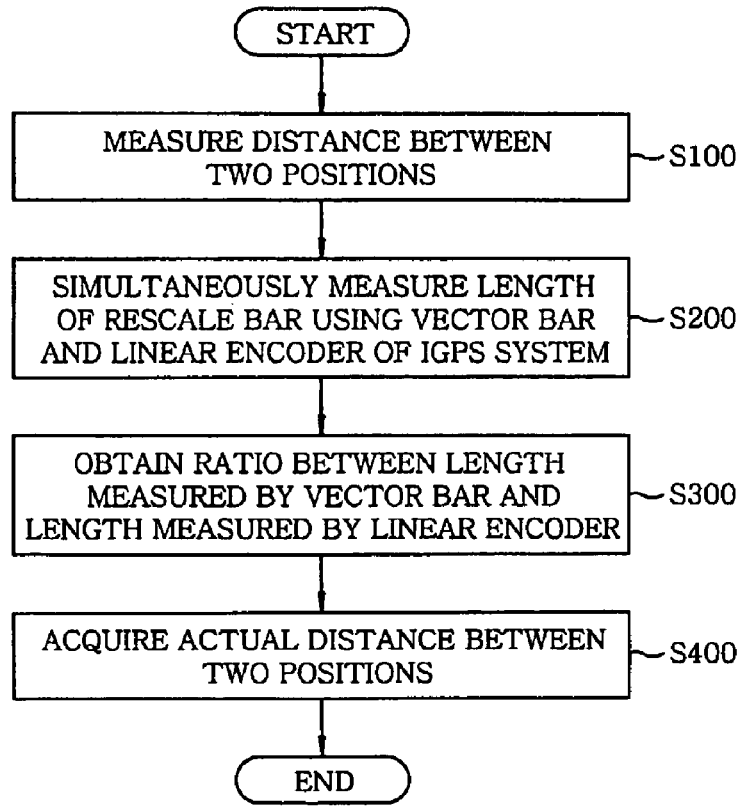

THREE-DIMENSIONAL MEASUREMENT SYSTEM AND RESCALING METHOD USING INDOOR GPS

TECHNICAL FIELD

The present invention relates to a three-dimensional measurement system using an IGPS (Indoor Global Positioning System), and more particularly, to a system and a method that acquire an accurate distance measurement by eliminating an error in distance measurement between two positions.

BACKGROUND ART

FIG. 1 is a diagram showing the configuration of a prior art three-dimensional measurement system using an IGPS. Referring to FIG. 1, the three-dimensional measurement system using an IGPS includes a scale bar 10, a vector bar 20, a plurality of optical transmitters 30a and 30b, and a receiver 40.

The receiver 40 is attached to the vector bar 20, and one end of the vector bar 20 is sharp to come into contact with the scale bar 10 in vertical during measurement. The receiver 40 receives electric waves and laser beams radiated from at least three optical transmitters 30a and 30b. At this time, the measurement is performed by moving the receiver 40 between two known positions. In the three-dimensional measurement system, measured coordinates of the positions are converted into a distance between the two positions, to thereby measure the distance between the two positions.

In the above-described three-dimensional measurement system using an IGPS, when the vector bar 20 indicates a point on the scale bar 10, a worker needs to use his/her hands to directly indicate the point. However, it is difficult for the worker to accurately indicate the point. Accordingly, a measurement value of the point may vary each time the measurement is performed. In addition, an error due to this problem may cause a cumulative error, and thus, when a distance between two positions is measured, the distance may be measured to be larger than an actual distance.

DISCLOSURE OF INVENTION

Technical Problem

The invention has been made in order to solve the above-described problems. It is an object of the invention to provide a system and method that acquire an accurate distance between two positions by eliminating an error in a distance measurement between two positions.

Technical Solution

According to an aspect of the invention, there is provided three-dimensional measurement system using an indoor global positioning system, including: a rescale bar having linear scales thereon; a linear encoder for measuring an absolute length within which the linear encoder moves on the rescale bar; a plurality of optical transmitters that radiates pan beams; and, a vector bar having one end attached to the linear encoder, and having a receiver to detect the pan beams radiated from the optical transmitters, the vector bar acquiring coordinates of two points where the vector bar moves by using the receiver, and measuring a relative length from the coordinates. A ratio between the absolute length and the relative length is applied in rescaling an actual distance between two positions to be measured.

According to another aspect of the invention, there is provided a rescale method for use in a three-dimensional measurement system using an IGPS, which includes: measuring a relative length between two points where a vector bar moves on a rescale bar having linear scales, a vector bar being fixed to a linear encoder, and the linear encoder being moved on the rescale bar; measuring an absolute length between the two points where the linear encoder having the vector bar fixed thereon moves on the rescale bar; calculating a ratio between the relative length and the absolute length; and applying the ratio in rescaling an actual distance between two positions to be measured.

Advantageous Effects

According to the present invention, even if a measurement is repeatedly performed in respect to a point indicated by the vector bar on the rescale bar, the present method is more accurate in comparison with a prior art in which the worker directly indicates the point. Therefore, even if a distance between positions longer than a measured distance are measured, there is no case that an error is accumulated.

BRIEF DESCRIPTION OF THE DRAWINGS

FIG. 1 is a diagram showing the configuration of a prior art three-dimensional measurement system using an IGPS;

FIG. 2 is a conceptual view illustrating a case where a receiver receives laser beams generated from optical transmitters according to the invention;

FIG. 3 is a diagram showing the configuration of a three-dimensional measurement system using an IGPS according to the invention; and FIG. 4 is a flowchart illustrating a rescale method performed in a three-dimensional measurement system using an IGPS according to the invention.

BEST MODE FOR CARRYING OUT THE INVENTION

The invention will now be described in detail with reference to the accompanying drawings.

FIG. 2 is a conceptual view illustrating a case where a receiver receives laser beams generated from optical transmitters used in the present invention.

In general, a GPS (Global Position System) recognizes and determines a three-dimensional coordinate corresponding to the position of a GPS receiver using three or more GPS satellites. This concept can also be applied in the indoor, which is representative of an indoor global positioning system (IGPS). The IGPS can detect the position of a receiver as a three-dimensional coordinate using a transmitter serving as a GPS satellite and the receiver serving as a GPS receiver.

Referring to FIG. 2, an optical transmitter 100 radiates two rotating fan beams 120 and 130. The rotating fan beams 120 and 130 may be laser pan beams or other optical beams. A receiver 110 receives the pan beams 120 and 130 radiated from the optical transmitter 100 to obtain the relative position to the optical transmitter 100 or a three-dimensional coordinate thereof. At this time, since the pan beams 120 and 130 are offset each other at a predetermined angle, the altitude of the receiver 110, which receives the pan beams 120 and 130, can be measured.

FIG. 3 is a diagram showing the configuration of a three-dimensional measurement system using an IGPS according to the invention. Referring to FIG. 3, the inventive three-dimensional measurement system using an IGPS includes a rescale bar 200, a linear encoder 300, a vector bar 400, a plurality of optical transmitters 500a and 500b, and a receiver 600.

The rescale bar 200 has linear scales thereon, through which a length between two points on the rescale bar 200 can be perceived. The linear encoder 300 can reciprocate on the rescale bar 200 in a direction in which the rescale bar 200 runs, such that an accurate length can be measured with good measurement accuracy. For example, the measurement accuracy of the linear encoder 300 is within 0.01 mm. In addition, since a lower end of the vector bar 400 is fixed on the linear encoder 300, the vector bar 400 can move together as the linear encoder 300 moves.

Further, the optical transmitters 500a and 500b radiate laser pan beams. Although only two optical transmitters 500a and 500b are shown in FIG. 3, it is substantially preferably to provide at least three optical transmitters.

The receiver 600, which may include one or more, is attached to an upper end of the vector bar 400 to detect the laser pan beams radiated from the optical transmitters 500a and 500b, thereby producing a three-dimensional coordinate corresponding to a current position thereof. According to the invention, as the vector bar 400 moves from one point to another point on the rescale bar 200, the receiver 600 produces three-dimensional coordinates corresponding to the respective points, and the vector bar 400 converts the three-dimensional coordinates into one-dimensional coordinates through its calculation, thereby obtaining a relative length between the two points where the vector moves on the rescale bar 200. Simultaneously, it is also possible to obtain an absolute length between the two points where the linear encoder 300 being engaged with the vector bar 400 moves on the rescale bar 200. Then, an actual distance between the two positions can be accurately obtained by rescaling the actual distance using the ratio between the relative length and the absolute length.

FIG. 4 is a flowchart illustrating a rescale method in a three-dimensional measurement system using an IGPS according to the invention. A rescale method using an IGPS will now be described with reference to FIG. 4.

First, three-dimensional coordinates of two positions to be measured are produce while moving a vector bar to the respective positions; and the three-dimensional coordinates are then converted into one-dimensional coordinates to calculate an actual distance between the two positions (S100).

Subsequently, the linear encoder 300 moves from one point to another point on the rescale bar 200 to measure three-dimensional coordinates of the two points by the receiver 600 on the vector bar 400 which is fixed on the linear encoder 300 and is engaged therewith. Then, the measured three-dimensional coordinates are changed into a length value, to thereby obtain a relative length between the two points where the vector 400 moves on the rescale bar 200. Simultaneously, an absolute length between the two points where the linear encoder 600 moves on the rescale bar 200 is measured by the linear encoder 300 (S200).

Next, a ratio between the relative length of the rescale bar 200 measured by the vector bar 400 and the absolute length of the rescale bar 200 measured by the linear encoder 300 is calculated (S300).

The calculated ratio is applied to rescale the actual distance between the two positions measured by the vector bar at S100, such that an accurate actual distance between the two positions can be obtained (S400).

Here, it is noted that an error which may be generated in obtaining the actual distance between the two positions depends on the measurement accuracy of the linear encoder 300.

The rescale method using the IGPS will now be described in detail by way of the following example. In case where an actual distance between two positions 'a' and 'b' in a measurement space is measured, it is assumed that the actual distance between the positions 'a' and 'b' acquired by the vector bar is 2200 mm. A rescale process should be performed in advance using the rescale bar before being measured the actual distance between the positions 'a' and 'b'. This is to accurately adjust measurement scales in the measurement space, thereby setting a measurement basis. If the relative length acquired by moving the vector bar attached to the linear encoder on the rescale bar is 1000 mm, and the absolute length acquired by the linear encoder is 1100 mm, a measurement error amounts to 100 mm. Therefore, it can be regarded that a distance is measured by a ratio of 10% more than the actual distance between two positions. To compensate the measurement error using the rescale process, this ratio 10% is applied to the actual distance between the positions 'a' and 'b', that is, 2200 mm, and therefore, the actual distance can be rescaled to 2000 mm.

Although the three-dimensional measurement system and the rescale method using an IGPS has been described in connection with the embodiment by way of the accompanying drawings, it should be noted that the embodiment is not limitative, but illustrative. It will be apparent to those skilled in the art that various modifications and changes can be made without departing from the scope and spirit of the invention.

The invention claimed is:

1. A three-dimensional measurement system using an indoor global positioning system, comprising:
   a rescale bar having linear scales thereon;
   a linear encoder for measuring an absolute length within which the linear encoder moves on the rescale bar;
   a plurality of optical transmitters that radiates pan beams; and
   a vector bar having one end attached to the linear encoder, and having a receiver to detect the pan beams radiated from the optical transmitters, the vector bar acquiring coordinates of two points where the vector bar moves by using the receiver, and measuring a relative length from the coordinates,
   wherein a ratio between the absolute length and the relative length is applied in rescaling an actual distance between two positions to be measured.

2. A rescale method for use in a three-dimensional measurement system using an IGPS, the rescale method comprising:
   measuring a relative length between two points where a vector bar moves on a rescale bar having linear scales, a vector bar being fixed to a linear encoder, and the linear encoder being moved on the rescale bar;
   measuring an absolute length between the two points where the linear encoder having the vector bar fixed thereon moves on the rescale bar;
   calculating a ratio between the relative length and the absolute length; and applying the ratio in resealing an actual distance between two positions to be measured.

* * * * *